United States Patent
Mao

(10) Patent No.: US 6,681,081 B2
(45) Date of Patent: *Jan. 20, 2004

(54) METHOD OF AVOIDING EXCESSIVE POLARIZATION MODE DISPERSION IN AN OPTICAL COMMUNICATIONS LINK

(75) Inventor: Xiaoping Charles Mao, Plano, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/093,638

(22) Filed: Mar. 11, 2002

(65) Prior Publication Data

US 2002/0131129 A1 Sep. 19, 2002

Related U.S. Application Data

(63) Continuation of application No. 09/220,732, filed on Dec. 24, 1998.

(51) Int. Cl.$^7$ ............................................. H04B 10/00
(52) U.S. Cl. ...................... 398/147; 398/152; 398/65; 398/81; 398/27
(58) Field of Search ................... 359/161, 156, 359/122, 110, 173; 398/147, 152, 81, 65, 27

(56) References Cited

U.S. PATENT DOCUMENTS

| 5,859,939 | A | | 1/1999 | Fee et al. ............... 359/156 |
| 5,930,414 | A | | 7/1999 | Fishman et al. ......... 359/156 |
| 6,130,766 | A | | 10/2000 | Cao ........................ 359/161 |
| 6,266,457 | B1 | | 7/2001 | Jacob ..................... 359/156 |
| 6,271,952 | B1 | | 8/2001 | Epworth ................. 359/156 |
| 6,396,606 | B1 | * | 5/2002 | Mao ........................ 359/156 |
| 6,421,153 | B1 | * | 7/2002 | Way et al. .............. 359/156 |

* cited by examiner

Primary Examiner—Kinfe-Michael Negash

(57) ABSTRACT

A method and apparatus for managing state-of-polarization (SOP) controllers along an optical communications link. When the polarization-mode dispersion (PMD) in the link exceeds a preset limit as determined by a PMD compensator, the SOP controller is directed to change rotation angle in an arbitrary fashion. This shift is only undertaken after other indicators are examined to determine that PMD is the main problem affecting the link, and not simply a consequence of a separate problem that the SOP controller rotation angle should not try to fix. By reducing unnecessary SOP adjustments which can disrupt data traffic, the reliability of the optical link is improved.

23 Claims, 5 Drawing Sheets

METHOD OF AVOIDING EXCESSIVE POLARIZATION MODE DISPERSION IN AN OPTICAL COMMUNICATIONS LINK

CROSS REFERENCE TO RELATED APPLICATIONS

This application is a continuation, of Application No. 09/220,732, filed Dec. 24. 1998.

Cross reference is made to the following co-pending patent applications, each being assigned to the same assignee as the present invention and the teachings included herein by reference.

| SER. NO. | TITLE | FILING DATE |
|---|---|---|
| U.S. SER. NO. 09/217,357 | FAULT ISOLATION OF AN OPTICAL LINK BY CORRELATING PMD EVENTS WITH OTHER MEASUREMENTS | Dec. 21, 1998 |

FIELD OF THE INVENTION

The present invention is generally related to optical communications systems, and more particularly to a method of limiting polarization-mode dispersion (PMD) in the optical link including reducing unnecessary corrective actions based upon a limit condition declared by a PMD compensator.

BACKGROUND OF THE INVENTION

In a typical optical communications system, an optical signal is emitted from a modulated laser diode comprising an optical transmitter in the form of a series of light pulses. Each light pulse is of extremely short duration, such as 40 ps, and is roughly Gaussian shaped as a function of time. In the frequency domain, this signal comprises numerous frequency components spaced very closely about the nominal center frequency of the optical carrier such as 193,000 GHz. As this type of modulated optical signal passes through an optical fiber, different frequency components of the optical signal travel at slightly different speeds due to an effect known as chromatic dispersion. In the course of an optical signal traveling through a very long fiber, such as 200 km, chromatic dispersion causes a single pulse of light to broaden in the time domain, and causes adjacent pulses to overlap one another, interfering with accurate reception. Fortunately, many techniques are known for compensating for chromatic dispersion.

Another form of dispersion is becoming a limiting factor in optical communications systems as progressively higher data rates are attempted. Polarization-mode dispersion (PMD) arises due to birefringence in the optical fiber. This means that for two orthogonal directions of polarization, a given fiber can exhibit differing propagation speeds. A light pulse traveling through a fiber will probably, unless some control means are employed, have its energy partitioned into polarization components that travel at different speeds. As with chromatic dispersion, this speed difference causes pulse broadening and restricts the usable bandwidth of each optical carrier.

A modulated optical signal arriving at an optical receiver must be of sufficient quality to allow the receiver to clearly distinguish the on-and-off pattern of light pulses sent by the transmitter. Conventionally, a properly designed optical link can maintain a bit-error-rate (BER) of $10^{-13}$ or better. Noise, attenuation, and dispersion are a few of the impairments that can render an optical signal marginal or unusable at the receiver. Generally, when an optical channel degrades to a bit-error-rate of $10^{-8}$, a communications system will automatically switch to an alternate optical channel in an attempt to improve the BER.

One common method of analyzing the quality of a modulated optical signal is a so-called "eye diagram", shown in FIG. 1. The eye diagram consists of overlaying successive frames of time-domain traces of the signal, with each frame corresponding to one period of the nominal periodicity of the modulation. As portrayed, the vertical axis represents instantaneous intensity of the received signal, and the horizontal axis corresponds to time. Many successive traces of transmitted "ones" and "zeros" define a region or window within the middle of the display. In the time axis, the window is bound on either side by the transitional leading and trailing edges of the pulses. Using this technique, a large clear area or "window" in the center with no encroachment from any side represents a good signal in that the presence of absence of a pulse during each clock cycle is clearly distinguishable.

Noise added to a signal appears as "fuzziness" of the lines defining the window. Sufficient noise can even obliterate the appearance of the window, representing a bad signal in that "ones" and "zeros" are no longer distinguishable. Impairments in the time axis, such as chromatic dispersion or polarization mode dispersion, cause the transitional areas of the display to close in upon the window from either side. Overlapping of pulses can require more stringent synchronization of the receiver's decision point, or even render the signal unusable.

A given optical receiver will automatically adapt to receive a modulated optical signal. Automatic gain control (AGC), frequency control, and phase lock-in are typically applied in sequence so that a threshold decision circuit can best sample the signal and decode every pulse. Superimposed upon the eye-diagram, an optimal point of operation for a threshold decision circuit would intuitively be at the center of the window, as shown by the "+" in FIG. 1. This means that the intensity threshold is about halfway between the zero values and one values observed on average.

Timewise, the center of the window corresponds to sampling the pulses in the middle of their duration when they tend to be of maximum intensity also shown by the "+" in FIG. 1. Intuitively, one can see how this choice for an operating point would be the most robust against either noise or timing impairments which cause the window to shrink.

A received optical signal can undergo some degree of change in, for example, pulse width without having an immediate impact on BER as observed by this optimally positioned main decision circuit. A particular type of receiver has been developed comprising at least two independent decision circuits of the type just described. A main decision circuit is dedicated to actual communications reception and is maintained at the optimum point, once it is established, within the center of the window. But for analyzing signal quality to a finer degree and for measuring degradation before it impacts BER of the actual communications, an auxiliary decision circuit is used to probe the extents of the operating window. Robustness to timewise disturbances is gaged by directing the auxiliary decision circuit to sample at various time offsets relative to the optimum point. Findings by the auxiliary circuit may even be used to fine-tune the optimum point settings of the main decision circuit.

The auxiliary decision circuit is set to a given timing offset and its output is monitored for BER, especially in comparison to the output of the main decision circuit. The BER measurement at each operating point can typically take several minutes. Gradually, BER data is accumulated for every offset value. As expected, a plot of this data resembles an inverted Gaussian curve with a minimum BER occurring some optimum offset, as shown in FIG. 2. A similar plot is derived by varying the amplitude threshold of the auxiliary decision circuit.

All of this BER data may be summarized into a "Q" factor or quality metric for the received signal. In general terms, the broader the range of timings over which a low BER can be sustained, the greater the Q factor of the signal. A receiver with an auxiliary decision circuit can measure and output such a Q factor.

During the time that an auxiliary decision circuit is accumulating measurements to compile a Q factor for a received signal, a shift in dispersion characteristics, particularly PMD characteristics, can take place along the fiber. This can result in an inaccurate assessment of the signal quality, especially if a PMD controller (PMDC) cannot quickly and sufficiently compensate for the PMD change. Therefore, the Q factor cannot be solely relied upon as a measure of path quality.

The Q measurement is particularly useful for assessing and fine-tuning an optical path that is already operating at a healthy low BER. The Q measurement estimates a BER without requiring any actual bit errors to occur. A Q measurement covering the BER range of $10^{-13}$ to $10^{-20}$ may be completed in a few minutes, whereas an actual errored bit might not be observed for hours, days or months.

Schemes to actively compensate for PMD generally involve detecting the presence of polarization-dependent timing differences and either a) applying delay elements to one or the other polarization to realign the timing of pulses or b) controlling the polarization state of the signal upon entry into the fiber, or at intermediate points along the fiber, such that birefringent effects are minimized or canceled out. Active compensation techniques are required because the PMD of a given fiber varies over time due to temperature and pressure changes along the fiber, and due to aging. A fiber that is installed above ground can exhibit fairly rapid fluctuations in PMD due to temperature and mechanical forces. A fiber buried underground can be sensitive to loads such as street traffic or construction work.

PMD of the optical carrier along the optical fiber may be reduced by the placement of one or more state-of-polarization (SOP) controllers along the fiber. A SOP controller can output light at one of several selectable polarization states. For optical communications, the relative rotation angle is the main property that is controlled. By adjusting the state-of-polarization of an optical carrier as it enters the fiber, the PMD effects of the fiber can be minimized. Furthermore, SOP controllers applied at several points along a fiber can effectively use the fiber's own characteristics to cancel PMD.

A common PMD controlled optical path comprises a transmitter, a fiber with one or several SOP controllers, a PMD controller (PMDC) and a receiver. For a modulated optical signal, the PMDC can sense the timing difference between a pair of orthogonal polarizations and selectively delay one polarization to realign the timing between the two signal halves before passing the signal to the receiver. The receiver expects a signal with less than a certain amount of chromatic and polarization-mode dispersion. As the polarization characteristics of the fiber change, the PMDC constantly monitors the signal and adjusts to minimize the PMD contribution to overall dispersion.

A problem arises in that the PMDC typically has a finite range of delay compensation that it can accomplish. Normally, the SOPs along a fiber are set such that, on average, the bulk of the PMD is curtailed before the PMDC. However, on some occasions, the PMD of a given fiber can drift beyond the range of the PMDC.

When the PMD of the optical path degrades, some corrective action may be necessary either to improve the PMD of the optical path or to divert the communications traffic along an alternate channel or path that will work better. Yet, it is equally important to the integrity of the traffic bearing signal to avoid taking unnecessary corrective actions. Each adjustment or switching operation can temporarily disrupt the revenue bearing traffic signal.

There is desired a way to quickly restore the integrity of an optical link under these conditions, including improving PMD, while reducing corrective actions based upon limit conditions declared by a PMDC.

SUMMARY OF THE INVENTION

The present invention achieves technical advantages as an optical communication system having a SOP controller along an optical link that is intelligently and responsively directed to change rotation states whenever a PMDC surpasses a preset compensation limit. The SOP controller is initially set such that the likelihood of the PMDC reaching a compensation limit is acceptably small. Upon the rare occasion that the compensation limit is exceeded, one or more of the SOP controllers are commanded to alter rotation of polarization by some arbitrary amount, for example, 45 degrees to 90 degrees. This rotation action will most likely result in lowering the end-to-end PMD to acceptable levels. The rare condition of high PMD occurs when the fiber shifts properties and exhibits a worst case dispersion in conjunction with the settings of the SOP controllers. Under worst conditions, changing any of the SOP controllers in either direction will most likely result in reduced PMD.

According to the present invention, since this rotation action can cause a momentary disruption in the traffic-bearing optical signal, abrupt changes in SOP controllers are intelligently made along an optical link only when absolutely necessary to preserve the integrity of the link. The present invention utilizes intelligent fault detection processing of the optical system to provide a safeguard against false triggering and making unnecessary adjustments to a SOP controller. A controller intelligently processes several indicators from system devices, including notifications from the PMDCs, to determine whether the limit condition declared by a PMDC is the main problem affecting the link, or if the limit condition is simply a consequence of a separate problem that the PMDC should not try to fix.

The present invention correlates several indicators to intelligently generate the switch rotation state indication for the SOP controller, including notifications from PMDCs, a detected BER, Q factor and signal-to-noise ratio (SNR), to decide whether a path degradation is truly attributable to PMD or other causes. The present invention provides a technique to gate whether or not the SOP controller should abruptly shift states.

DESCRIPTION OF THE PREFERRED EMBODIMENT

Figure 2:
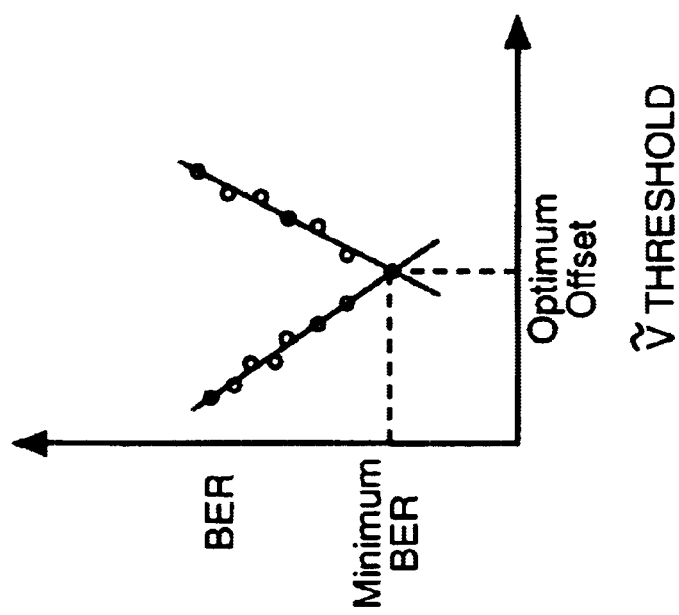
FIG. 2 is a graph of a typical BER measurement as a function of offset which can be used to determine a Q factor of an optical signal.
Figure 1:
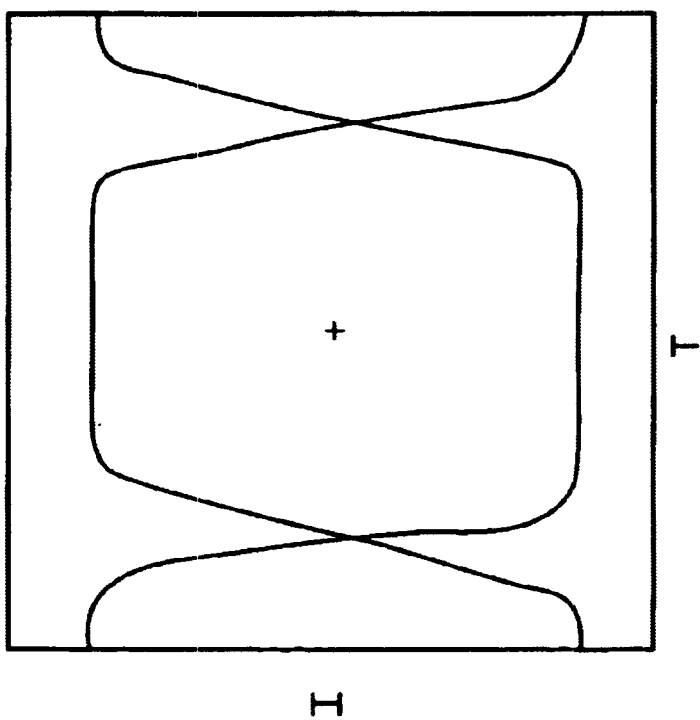
FIG. 1 illustrates an eye diagram which is typically used to analyze the quality of a modulated optical signal.
Figure 3:
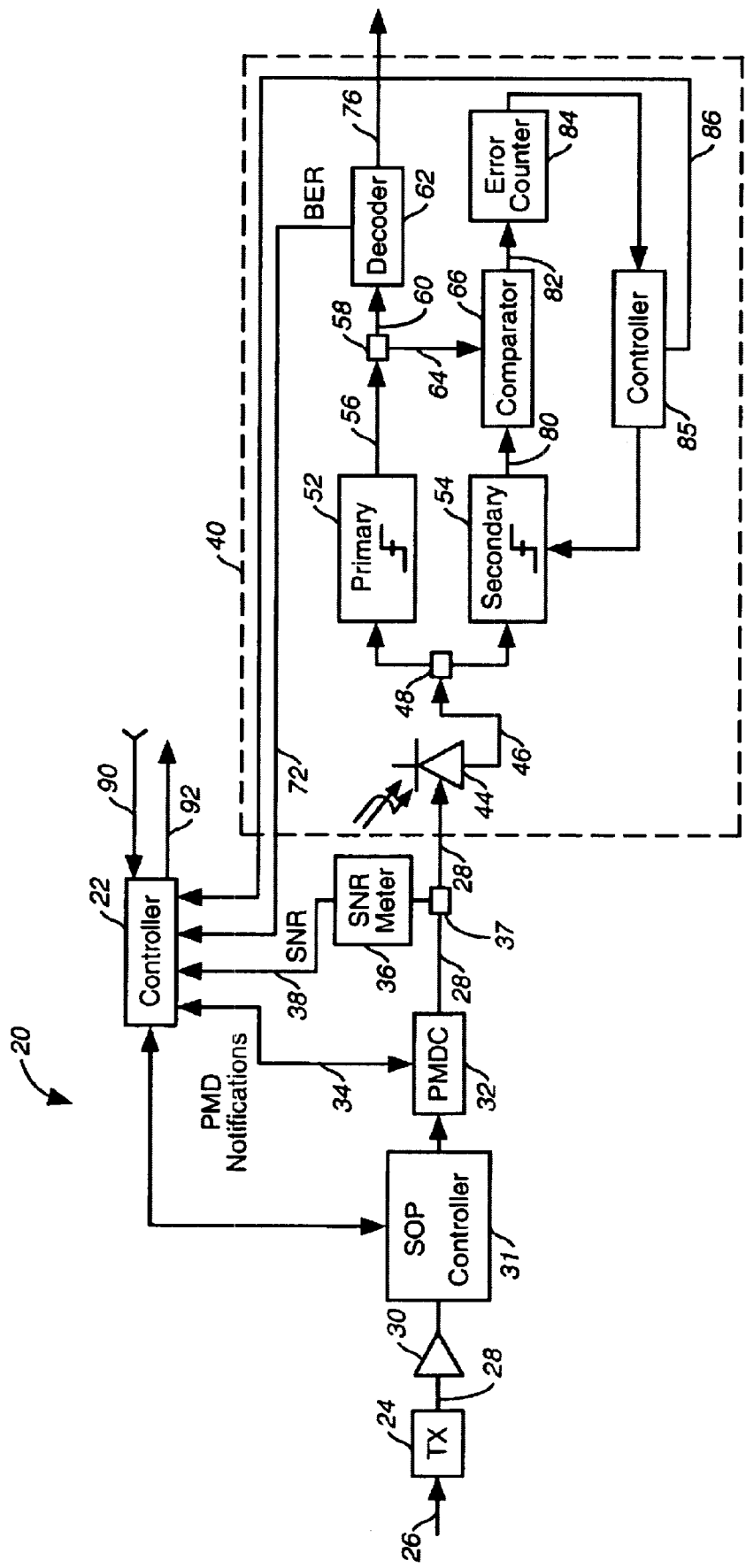
FIG. 3 is a block diagram of an optical communications system according to the present invention having a controller adapted to perform the method of the present invention.

Referring now to FIG. 3, there is illustrated a block diagram of an optical communication system 20 according to the present invention. System 20 includes a microprocessor based controller 22 receiving and processing several indicator inputs from the system to perform fault management according to the preferred embodiment of the present invention. System 20 is seen to include an optical transmitter 24 including a semiconductor laser emitting light that is intensity modulated by a corresponding electrical data signal provided on input line 26. The electrical data signal can be a SONET-compliant STS-48 or STS-192 synchronous data signal bearing digital data at about 2.5 Gbps or 9.9 Gbps, respectively. The intensity modulated optical carrier is provided by transmitter 24 into optical fiber 28. The optical carrier may be a SONET OC-48 or OC-192 signal bearing digital data at approximately 2.5 or 9.9 Gbps, respectively. The optical fiber 28 may include an optical amplifier generally shown at 30 for ampliflying the optical carrier along the length thereof. It is noted transmitter 24 may include several semiconductor lasers, each providing light that is intensity modulated by a corresponding input electrical data signal to provide Wavelength Division Multiplexing (WDM) if desired. For purposes of teaching and illustrating the present invention, a single semiconductor laser generating a single optical carrier is discussed to teach and describe the present invention with it being understood that the present invention can apply to each of several or all optical carriers and being communicated over a common optical fiber.

Still referring to FIG. 3, optical system 20 can be seen to include a state of polarization (SOP) controller 31 and a polarization mode dispersion controller (PMDC) 32 provided along optical fiber 28. The SOP controller 31 and the PMDC 32 both compensate the polarization-dependent timing differences of the optical signal. The SOP controller 31 sets a fixed rotation angle of the optical signal to curtail PMD before the PMDC 32. For a modulated optical signal, the PMDC 32 actively senses the timing difference between the pair of orthogonal polarizations and selectively delays one polarization to realign the timing between the two signal halves before passing the signal to a receiver. As the polarization characteristics of the fiber change, the PMDC 32 constantly monitors the optical signal and adjusts the delay to minimize the PMD contribution to overall dispersion. PMDC 32 also provides several PMD notifications to controller 22 on output line 34, as will be discussed further shortly.

In practice, one or several PMDCs 32 can be provided along the length of optical fiber 28, and can be provided at several locations including proximate the transmitter 24 for providing forward compensation, in the middle of the link, proximate the receiver, or any combination thereof depending on the design of the optical communication system. Thus, limitation to the location or number of PMDC 32 is not to be inferred in the present invention.

Optical system 20 is further seen to include a signal-to-noise ratio (SNR) meter 36 receiving a tapped a portion of the optical carrier from an optical tap 37 coupled to the fiber link 28. SNR meter 36 provides an indicator indicative of the signal-to-noise ratio of the optical carrier on output line 38.

The optical fiber 28 terminates at the receive end at an optical receiver 40. The optical carrier transmitted through fiber 28 is detected by a corresponding photo detector 44 generating a signal in the electrical domain. The output of the optical photo detector 44 is provided on output line 46 and provided to an electrical splitter 48. Splitter 48 divides the electrical data signal, providing one part to a primary decision circuit 52 and the other second part to a secondary decision circuit 54.

The primary decision circuit 52 includes circuitry determining whether or not the received electrical signal in the time domain is a logic one or a logic zero. This primary decision circuit 52 is set to an optical setting, and has adjustable settings to adjust the decision point as a function of the circuit design and information from the auxiliary decision circuitry to maximize the bit error rate (BER). The primary decision circuit 52 handles the usable data traffic and provides the output digital data to a signal tap 58. Digital data is output by tap 58 on primary output line 60 to a decoder 62. Tap 58 also provides an identical stream of digital data via the secondary output line 64 to comparator 66 as will be discussed shortly. The decoder 62 provides multiple processing functions to provide, among other things, bit error correction, and also determines a bit error rate (BER). Decoder 62 provides a BER signal on output line 72 indicative of the determined BER. Decoder 62 may be a forward error correction (FEC) decoder as well. The output of the decoder 62 provides the processed digital data from the receiver 40 to output line 76. Ideally, the output digital data provided on output line 76 is identical to the input electrical digital data on input line 26.

Referring now to the secondary auxiliary decision circuit 54, the output of this circuit 54 is provided on output line 80 to comparator 66. Comparator 66 compares the digital data output of the primary decision circuit 52 with the output of the auxiliary decision circuit 54 to determine differences therebetween. The output of the comparator 66 is provided on output line 82 to an error counter 84. The auxiliary circuitry comprising secondary decision circuit 54, comparator 66, an error counter 84, and a controller 85 are used to ultimately determine a Q factor of the optical carrier and provides this Q factor as an indicator on output line 86 by observing the error count.

Robustness to timewise disturbances is gauged by directing the auxiliary decision circuit 54 to sample at various time offsets relative to the optimum set point of the primary decision circuit 52. The secondary decision circuit 54 has adjustment circuitry which facilitates the dithering of the decision point to different levels to probe the extents of the operating window. The comparator 66 determines the variance of the output from the secondary decision circuit 54 in view of the output from the primary decision circuit 52. Controller 85 dithers the decision point of the secondary decision circuit 54 and has no effect on the output digital data on output line 76, but allows the decision level to be adjusted to determine if this improves the Q factor of the optical carrier by observing the error count from error counter 84, and facilitates adjustments of the optimum setting of the primary decision circuit 52 where necessary. In essence, the auxiliary circuitry in receiver 40 allows the data signal to be analyzed without affecting the primary receiver circuitry to intelligently determine if improvements can be made to the primary circuitry.

According to the present invention, controller 22 includes software or equivalent hardware to receive and process various inputs from the various portions of the optical circuit 20 to provide fault management of the optical communications system 20. The controller 22 receives and analyzes the various inputs, and processes them to distinguish between, among other things, fiber failure, PMD-related degradations, and failure of monitoring equipment itself The controller 22 provides outputs on line 92 that may be used to alter protect switching logic and to alert maintenance personnel as to the probable cause of degraded path indications. In the preferred embodiment, four inputs are supplied for each optical channel to the controller 22 including the bit error rate (BER) observed at the receiver, the Q measurement obtained at the receiver, alarms or notifications from the PMDCs along the optical path, and the optical signal-to-noise ratio as measured by the selective optical power meter tapped onto the path near the receiver. However, limitations to these indicators is not intended and other system indicators can be generated and analyzed as well and are encompassed by the present invention. Controller 22 maintains a time stamped record of recent measurements and notifications received via the supplied inputs.

Figure 4:
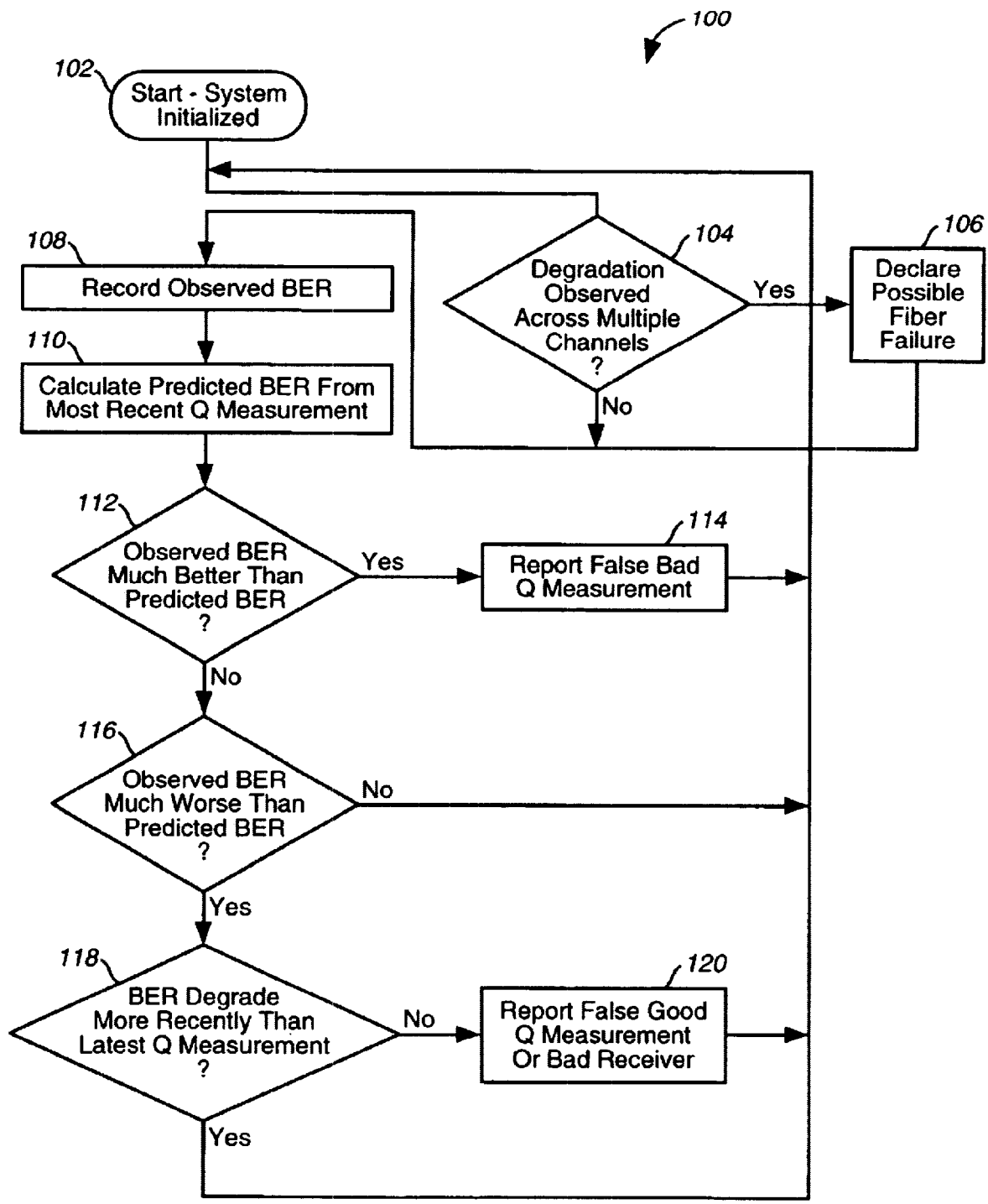
FIG. 4 is a flow chart illustrating how the controller ascertains and processes several inputs from the optical communication network to distinguish between fiber failure, PMD-related degradations, and failure of monitoring equipment according to the preferred embodiment of the present invention.

Referring now to FIG. 4, there is shown a flow diagram of the processing algorithm of controller 22 according to the preferred embodiment of the present invention being generally shown at 100. This method is preferably implemented in software, but could be implemented in hardware if desired.

The method starts at step 102 whereby the optical system is initialized. Next, at step 104, the controller 22 determines if degradation of the system is observed across multiple optical channels by observing indicators from the system devices associated with these other channels. Collectively, these indicators are received on input line 90 as shown in FIG. 3. If degradation of the system is observed across the multiple optical channels at step 104, at step 106 the controller 22 will declare a possible fiber failure due to the correlation that several optical channels are degraded and degradation is not limited to one channel.

At step 104, if degradation is not observed across multiple channels, the algorithm proceeds to step 108 whereby the current observed BER provided by decoder 62 via output line 72 is time stamped and recorded at controller 22. Next, at step 110 the controller 22 calculates the predicted BER based upon the most recent recorded Q measurement provided by error counter 84 via output line 86, as calculated according to the algorithm 130 of FIG. 5 which will be described shortly. The BER can be predicted based upon the most recent recorded Q measurement according to various known algorithms and mathematical relationships. Some known ways of calculating a BER from the Q measurement are described in the two referenced articles identified in the section Background of the Invention entitled "Q-Factor measurements for High Speed Optical Transmissions", and "Margin Measurement in Optical Amplifier Systems", the teachings of which are incorporated herein by reference.

Next, the algorithm proceeds to step 112 where it is determined whether or not the observed BER recorded in step 108 is significantly better than the predicted BER calculated in step 110. If the observed BER is determined to be significantly better than the predicted BER, the algorithm proceeds to step 114 and reports that the most recent recorded Q measurement from step 110 is suspect and false. This report is based upon the fact that a healthy observed BER is always the reliable indicator of the true operating characteristic of the network 20. If a healthy BER is being reported by decoder 62, any Q measurement to the contrary must necessarily be in error.

If at step 112 the observed BER is not determined to be significantly better than the predicted BER, the algorithm proceeds to step 116 to determine if the observed BER is significantly worse than the predicted BER. If the answer is no, the algorithm proceeds back to step 104 since the observed BER is generally close to the predicted BER, and thus, the most recent recorded Q measurement is determined to be valid.

Figure 5:
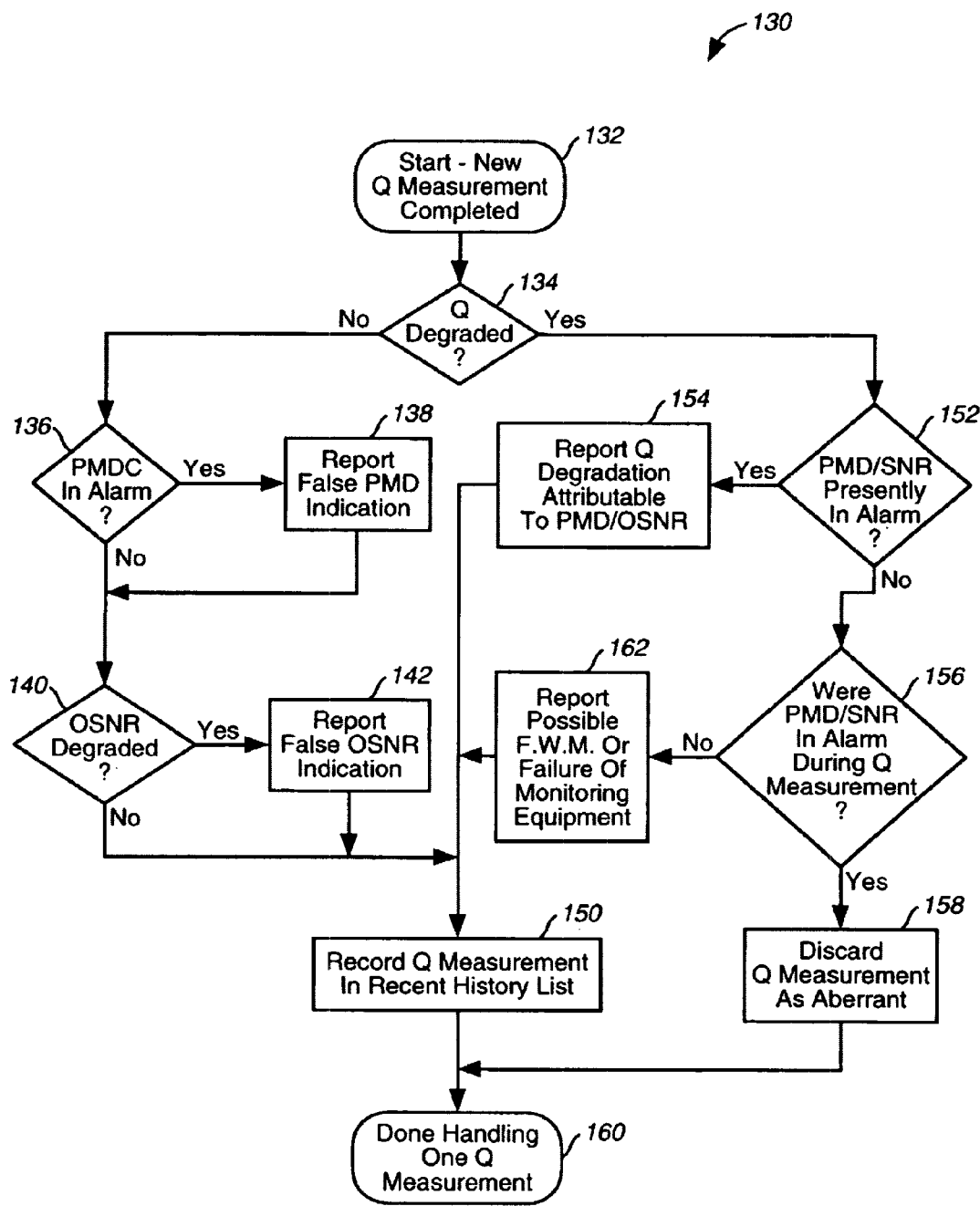
FIG. 5 is a flow chart illustrating how a Q measurement is calculated and recorded as a valid recent Q measurement for use in the algorithm of FIG. 4.

If, however, at step 116 the observed BER is determined to be significantly worse than the predicted BER, the algorithm proceeds to step 118 to determined whether or not the observed BER has significantly degraded more recently than the latest recorded Q measurement according to the algorithm 130 in FIG. 5, which will be described shortly. If at step 118 the answer is no, the algorithm proceeds to step 120 and reports that the latest Q measurement recorded in algorithm 130 of FIG. 5 is false, or that the receiver 40 is bad. This can be determined because there has been sufficient time for the Q measurement to observe the degrading BER. If at step 118, however, it is determined that the observed BER has degraded more recently than the latest recorded Q measurement provided in algorithm 130, the algorithm has no basis for invalidating the recorded Q measurement and proceeds back to step 104 since a recent degraded BER would account for why the observed BER is much worse than the predicted BER based on the most recent recorded Q measurement.

In summary, algorithm 100 determines whether or not recorded Q measurement is valid or false by determining whether or not the predicted BER from the recorded Q measurement is in line with the recorded observed BER. Algorithm 100 can also determine whether or not the receiver 40 is bad.

Referring now to FIG. 5, there is shown generally at 130 a flow diagram of the processing algorithm of controller 22 to record a completed Q measurement in a recent history list for use in algorithm 100, at step 110.

At step 132, a new Q measurement is determined by error counter 84 and completed. This Q measurement typically takes a few minutes to complete as the auxiliary receiver is adjusted to different decision points. Next, at step 134, it is determined whether or not the new Q measurement of step 132 has degraded significantly over the previous Q measurement as provided by error counter 84. If the answer is no, the algorithm proceeds to step 136 to determine if the PMDC 32 is an alarm state. If the answer is yes, the algorithm proceeds to step 138 to report that the PMD alarm indication is false. It is known that the PMD indication is false since it is not normal for the PMDC 32 to be in alarm state when the Q measurement has not degraded as determined in step 134. If at step 136 the PMDC is not in the alarm state, the algorithm proceeds to step 140.

At step 140, the controller 22 determines if the optical signal to noise ratio (OSNR) from SNR meter 36 has recently degraded. If the answer is yes, the algorithm proceeds to step 142 and reports a false OSNR indication. It is reported at step 142 that the OSNR indication is false because if the OSNR has degraded, it would have be determined at step 134 that the Q measurement would have been degraded.

If, however, at step 140 the OSNR is not determined to have degraded, the algorithm proceeds to step 150 and the new Q measurement of step 132 is determined to be valid and is recorded in the most recent history list at controller 22 for use at step 110 in flow diagram 100.

Referring now back to step 134, if it is determined that the most recent Q measurement of step 132 has appreciably degraded since the last Q measurement of the previous iteration of algorithm 130, the algorithm proceeds to step 152.

If at step 152 it is determined that either the PMDC 32 or the SNR meter 36 are presently in alarm state by observing the output on line 34 or line 38 from the respective devices, the algorithm proceeds to step 154 and reports that the Q measurement degradation determined in step 134 is attributable to the particular PMDC 32 or the SNR meter 36 in an alarm state. The correlation that the Q measurement is determined to have significantly degraded in step 134 in combination with an alarm from either the PMDC 32 or the SNR meter 36 is used to isolate whether or not the Q measurement degradation is attributable to the PMDC 32 or the SNR meter 36. The respective alarm is indicative of which system device is indicating a problem.

At step 152, typical alarms of the PMDC 32 include, but are not limited to:

I. the PMD compensator is approaching the limit of its compensating ability;
II. the optical signal has exceeded the compensating range of the PMD compensator;
III. the range of change of the PMD exceeds at predetermined characteristic value or exceeds a tracking speed of the compensator;
IV. an element in the PMD compensator has failed.

It is noted that degradation in Q factor is usually caused by a poor signal-to-noise ratio or timing dispersion, or a combination thereof. If an abrupt degradation is observed during the course of making Q measurements, the notifications from the PMDC 32 along the line are reviewed by controller 22 to see if a polarization-related anomaly occurred during that time. This information is used by controller 22 to disregard selected readings taken during the Q measurement, or to invalidate a Q measurement entirely.

Cross-checking by controller 22 among the Q measurement, SNR, and PMD notifications also allows for monitoring of the measurement equipment itself. If it is determined that the Q measurement factor degrades and the SONET error rate escalates comparably, it is expected that the PMD notifications and SNR readings would account for the degradation. If neither PMD or SNR readings reflect any degradation, then one of these monitoring devices is determined by controller 22 to be malfunctioning, or it is determined that an impairment is occurring between the tap for monitoring equipment and the decision circuit of the receiver, perhaps at the receiver front end.

In a different scenario, if a PMD event is registered that would be severe and prolonged enough to theoretically prevent signal reception, yet the SONET BER and Q measurements are not determined by controller 22 to degrade appreciably, the PMDC itself may be malfunctioning. This cross-checking according to the present invention can prevent unnecessary protection switching of optical channels that might result if only a single indication were relied upon which can disrupt data traffic.

The method of the present invention first integrates and processes several input indicators to distinguish between, upon other things, fiber failure, PMD-related degradations or failure of the monitoring equipment itself. The outputs provided by controller 22 of the present invention can be used to alter protect switching logic and to alert network maintenance personal as to the probably cause of degraded path indications. The present invention intelligently assimilates and analyzes indicators and notifications from various network equipment to provide better fault management in the optical communication system.

Figure 6:
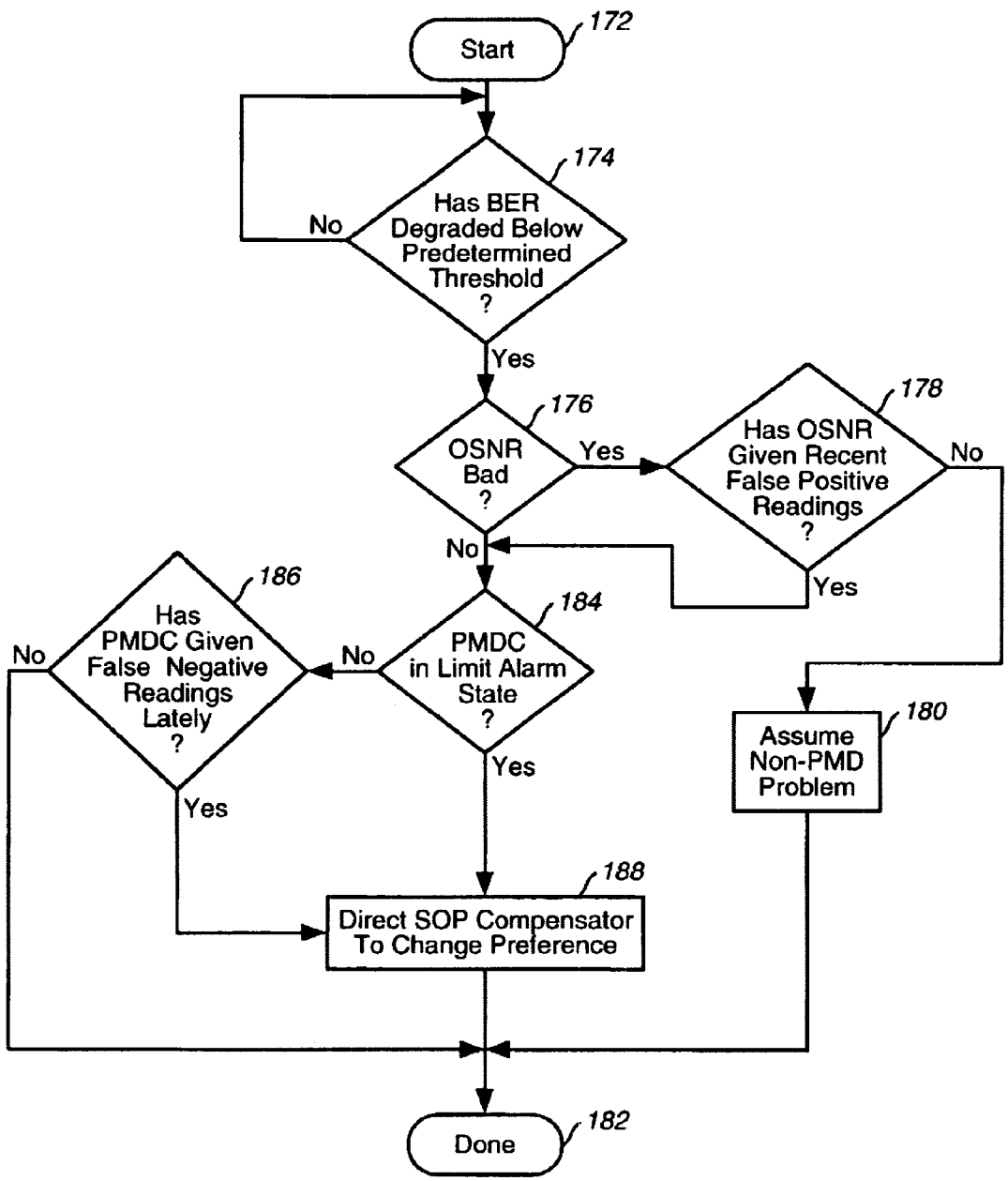
FIG. 6 is a flow diagram of the algorithm of the present invention for intelligently changing the rotation angle of the PMD compensator as a function of PMDC alarms.

According to the present invention, if controller 22 further determines according to the algorithm 170 shown in FIG. 6 that the limit condition declared by the PMDC 32 is the main problem affecting the link, controller 22 instructs SOP compensator 31 via control line 34 to alter rotation by some arbitrary amount, for example, 45 degrees or 90 degrees. This action will most likely result in lowering the end-to-end PMD to acceptable levels. The rare condition of high PMD occurs when the fiber shifts properties, and exhibits a worst case dispersion in conjunction with the settings of the SOP compensator 31. Therefore, changing any of the polarization of SOP compensators 31 in either direction will probably result in reduced PMD.

If, however, controller 22 determines via algorithm 170 that the limit condition declared by the PMDC 32 is not the main problem affecting the link 20, or is simply a consequence of a separate problem, the controller 22 refrains from directing the SOP compensator 31 to attempt to fix the problem. Thus, the present invention provides a safeguard against false triggering. The present invention provides a technique to gate whether or not the SOP compensator 31 should abruptly shift state. The present invention maintains the integrity of the traffic bearing signal by avoiding making unnecessary corrective actions, such as switching channels or altering the rotation of a SOP compensator 31, which unnecessarily temporally disrupt the traffic bearing signal, and which may not actually correct a PMD problem.

Referring to FIG. 6, algorithm 170 of controller 22 starts at 172 and proceeds to step 174 to determine if the observed BER from decoder 62 has degraded past an acceptable predetermined threshold i.e. $10^{-10}$. If the answer is no, the algorithm simply proceeds back to step 174 and iterates until it is determined at step 174 that the observed BER has degraded past the acceptable threshold. This is because as long as the observed BER is determined to be healthy and above a predetermined acceptable threshold, there is no need to perturb the settings of any PMD compensators 31, regardless whether or not the PMDC alarms are being generated. As long as the observed BER is acceptable, it is known that the signal through the optical network link 20 is acceptable.

At step 174, once controller 22 determines that the observed BER has degraded past the acceptable threshold, the algorithm proceeds to step 176 to determine if the SNR meter 36 is bad as determined by algorithm 130 as shown in FIG. 5. If the answer is yes, the algorithm proceeds to step 178 and controller 22 determines if the SNR meter 36 has given recent false positives. If the answer is no, controller 22 deems that the signal to noise ratio in link 20 is bad and that the degraded BER determined in step 174 is not PMD related. The controller 22 then lets the FWM controller handle the SNR problem at step 180 and the algorithm proceeds to step 182 to finish the routine.

If at step 176 is not determined that the SNR meter 36 is bad, or if at step 178 it is determined that the SNR meter 36 has given recent false positives, the algorithm proceeds to step 184 to determine if the PMDC 32 is in the alarm state. If the answer is no, the algorithm proceeds to step 186 and controller 22 determines if the PMDC 32 has given recent false negative readings. If the answer is no, it is determined that the PMDC 32 is properly operating and there is not a PMD problem. Therefore, the controller 22 restrains from changing any settings of the SOP compensator 31.

Referring back to step 184, if it is determined that the PMDC 32 is generating valid alarms, such as those four alarms previously mentioned, the algorithm proceeds to step 188 whereby it is determined that there is a PMD problem. Responsively, the controller 22 instructs the SOP compensator 31 to change preferences to alter rotation by some arbitrary amount, for example 45 degrees or 90 degrees. This action then will most likely result in lowering the end-to-end PMD to acceptable levels. Again, since the rare condition of high PMD occurs when the fiber shifts properties and exhibits a worst case dispersion in conjunction with the settings of the SOP compensators 31, changing any of the SOP compensators 31 in either direction will result in lower PMD in link 20.

Referring to step 186, controller 22 determines that the PMDC is not in the alarm state at step 184, but in step 186 the PMDC 32 is determined by controller 22 to have given false negative readings lately, the algorithm again proceeds to step 188 to cause the SOP compensators 31 to change preferences. This changing of preferences lowers the end-to-end PMD to acceptable levels. It is noted at step 188 that algorithm 170 may restrain from changing preferences of the SOP compensator 31 if a change to the SOP compensator was recently made since changing the rotation angle may be futile.

In summary, the present invention provides an apparatus and method whereby the SOP compensator 31 along the link 20 are directed to change states whenever it is intelligently determined that a PMDC 32 surpasses a preset compensation limit, and when it is also determined that a PMDC 32 is the main problem affecting the link, and not simply a consequence of a separate problem. The PMD controllers 32 are initially set such that the likelihood of reaching a compensation limit is acceptably small. Upon the rare occasion that the compensation limit is exceeded, one or more SOP compensator 31 is given a command by controller 22 to alter rotation by some arbitrary amount, for example, 45 degrees or 90 degrees. This action most likely results in lowering the end-to-end PMD to acceptable levels, safeguarding against false triggering and reducing unnecessary interruptions to traffic bearing signals.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. An apparatus for improving polarization mode dispersion (PMD) in an optical signal transmitted by an optical communications system, the apparatus comprising:
    means for receiving a first indicator related to PMD associated with the optical communications system;
    means for receiving a second indicator indicative of an attribute of the optical signal in the optical communications system; and
    means for instructing a polarization controller associated with the optical communications system to selectively shift an angle of polarization of the optical signal as a function of the first indicator and the second indicator to improve the PMD of the optical signal.

2. The apparatus of claim 1, wherein the second indicator comprises an indication of a bit-error-rate (BER) of the optical signal.

3. The apparatus of claim 2, further comprising:
    means for receiving a third indicator indicative of a Q-factor of the optical signal,
    wherein the means for instructing the polarization controller to selectively shift an angle of polarization of the optical signal further instructs the polarization controller to selectively shift the angle of polarization as a function of the first, second and third indicator.

4. The apparatus of claim 3, wherein the first indicator comprises one or more of a group consisting of:
    i) an indication that a PMD compensator associated with the optical communications system is approaching a limit of its compensating ability;
    ii) an indication that the optical signal has exceeded a compensating range of a PMD compensator associated with the optical communications system;
    iii) an indication that a rate of change of the PMD exceeds at least one of a predetermined value and a tracking speed of a PMD compensator associated with the optical communications system; and
    iv) an indication that an element in a PMD compensator associated with the optical communications system has failed.

5. The apparatus of claim 2, further comprising the steps of:
    means for receiving a third indicator indicative of a signal-to-noise ratio (SNR) of the optical signal,
    wherein the means for instructing the polarization controller to selectively shift the angle of polarization of the optical signal further instructs the polarization controller to selectively shift the angle of polarization as a function of the first, second and third indicator.

6. The apparatus of claim 2, wherein the first indicator comprises one or more of a group consisting of:
    i) an indication that a PMD compensator associated with the optical communications system is approaching a limit of its compensating ability;
    ii) an indication that the optical signal has exceeded a compensated range of a PMD compensator associated with the optical communications system;
    iii) an indication that a rate of change of the PMD exceeds at least one of a predetermined value and a tracking speed of a PMD compensator associated with the optical communications system; and
    iv) an indication that an element in a PMD compensator associated with the optical communications system has failed.

7. The apparatus of claim 1, wherein the second indicator comprises an indication of a Q-factor associated with the optical signal.

8. The apparatus of claim 7, wherein the first indicator comprises one or more of a group consisting of:
    i) an indication that a PMD compensator associated with the optical communications system is approaching a limit of its compensating ability;
    ii) an indication that the optical signal has exceeded a range of a PMD compensator associated with the optical communications system;
    iii) an indication that a rate of change of the PMD exceeds at least one of a predetermined value and a tracking speed of a PMD compensator associated with the optical communications system; and iv) an indication that an element in a PMD compensator associated with the optical communications system has failed.

9. The apparatus of claim 1, wherein the second indicator comprises a signal-to-noise ratio (SNR) of the optical signal.

10. The apparatus of claim 1, wherein the first indicator comprises one or more of a group consisting of:
   i) an indication that a PMD compensator associated with the optical communications system is approaching a limit of its compensating ability;
   ii) an indication that the optical signal has exceeded a compensating range of a PMD compensator associated with the optical communications system;
   iii) an indication that a rate of change of the PMD exceeds at least one of a predetermined value and a tracking speed of a PMD compensator associated with the optical communications system; and
   iv) an indication that an element in a PMD compensator associated with the optical communications system has failed.

11. A device for improving polarization mode dispersion (PMD) in an optical signal transmitted by an optical communications system, comprising:
   a memory configured to store instructions; and
   a processor configured to execute the instructions in the memory to:
      receive a first indicator related to PMD associated with the optical communications system,
      receive a second indicator indicative of an attribute of the optical signal in the optical communications system, and
      instruct a polarization controller to selectively shift an angle of polarization of the optical signal as a function of the first indicator and the second indicator to improve the PMD of the optical signal.

12. The device of claim 11, wherein the second indicator comprises an indication of a bit-error-rate (BER) of the optical signal.

13. The device of claim 12, the processor further configured to execute the instructions in the memory to:
   receive a third indicator indicative of a Q-factor of the optical signal, and
   instruct the polarization controller to selectively shift the angle of polarization of the optical signal as a function of the first, second and third indicator.

14. The apparatus of claim 13, wherein the first indicator comprises one or more of a group consisting of:
   i) an indication that a PMD compensator associated with the optical communications system is approaching a limit of its compensating ability;
   ii) an indication that the optical signal has exceeded a compensating range of a PMD compensator associated with the optical communications system;
   iii) an indication that a rate of change of the PMD exceeds at least one of a predetermined value and a tracking speed of a PMD compensator associated with the optical communications system; and
   iv) an indication that an element in a PMD compensator associated with the optical communications system has failed.

15. The apparatus of claim 12, the processor further configured to execute the instructions in the memory to:
   receive a third indicator indicative of a signal-to-noise ratio (SNR) of the optical signal, and
   instruct the polarization controller to selectively shift the angle of polarization of the optical signal as a function of the first, second and third indicator.

16. The apparatus of claim 12, wherein the first indicator comprises one or more of a group consisting of:
   i) an indication that a PMD compensator associated with the optical communications system is approaching a limit of its compensating ability;
   ii) an indication that the optical signal has exceeded a compensating range of a PMD compensator associated with the optical communications system;
   iii) an indication that a rate of change of the PMD exceeds at least one of a predetermined value and a tracking speed of a PMD compensator associated with the optical communications system; and
   iv) an indication that an element in a PMD compensator associated with the optical communications system has failed.

17. The device of claim 11, wherein the second indicator comprises an indication of a Q-factor associated with the optical signal.

18. The apparatus of claim 17, wherein the first indicator comprises one or more of a group consisting of:
   i) an indication that a PMD compensator associated with the optical communications system is approaching a limit of its compensating ability;
   ii) an indication that the optical signal has exceeded a compensating range of a PMD compensator associated with the optical communications system;
   iii) an indication that a rate of change of the PMD exceeds at least one of a predetermined value and a tracking speed of a PMD compensator associated with the optical communications system; and
   iv) an indication that an element in a PMD compensator associated with the optical communications system has failed.

19. The apparatus of claim 11, wherein the second indicator comprises a signal-to-noise ratio (SNR) of the optical signal.

20. The apparatus of claim 11, wherein the first indicator comprises one or more of a group consisting of:
   i) an indication that a PMD compensator associated with the optical communications system is approaching a limit of its compensating ability;
   ii) an indication that the optical signal has exceeded a compensating range of a PMD compensator associated with the optical communications system;
   iii) an indication that a rate of change of the PMD exceeds at least one of a predetermined value and a tracking speed of a PMD compensator associated with the optical communications system; and
   iv) an indication that an element in a PMD compensator associated with the optical communications system has failed.

21. A device for improving polarization mode dispersion (PMD) in an optical signal transmitted by an optical communications system, comprising:
   at least one interface configured to:
      receive a first indicator related to PMD associated with the optical communications system, and
      receive a second indicator indicative of an attribute of the optical signal in the optical communications system; and
   logic circuitry configured to:
      instruct a polarization controller to selectively shift an angle of polarization of the optical signal as a function of the first indicator and the second indicator to improve the PMD of the optical signal.

22. A computer-readable medium containing instructions for controlling at least one processor to perform a method for improving polarization mode dispersion (PMD) in an optical signal transmitted by an optical communications system, the method comprising:

receiving a first indicator related to PMD associated with the optical communications system;

receiving a second indicator indicative of an attribute of the optical signal in the optical communications system; and instructing a polarization controller to selectively shift an angle of polarization of the optical signal as a function of the first indicator and the second indicator to improve the PMD of the optical signal.

23. A method for improving polarization mode dispersion (PMD) in an optical signal transmitted by an optical communications system, the method comprising:

receiving a first indicator related to PMD associated with the optical communications system;

receiving a second indicator indicative of an attribute of the optical signal in the optical communications system; and instructing a polarization controller associated with the optical communications system to selectively shift an angle of polarization of the optical signal as a function of the first indicator and the second indicator to improve the PMD of the optical signal.

* * * * *